US012749632B2

(12) United States Patent
Schroedl

(10) Patent No.: US 12,749,632 B2
(45) Date of Patent: Sep. 29, 2026

(54) MULTI-TERMINAL TRACER WIRE ACCESS POINT

(71) Applicant: COPPERWELD GROUP, INC., Brentwood, TN (US)

(72) Inventor: Trevor Schroedl, Big Lake, MN (US)

(73) Assignee: Copperweld Group, Inc., Brentwood, TN (US)

( * ) Notice: Subject to any disclaimer, the term of this patent is extended or adjusted under 35 U.S.C. 154(b) by 120 days.

(21) Appl. No.: 18/794,869

(22) Filed: Aug. 5, 2024

(65) Prior Publication Data

US 2026/0038747 A1 Feb. 5, 2026

(51) Int. Cl.
*H01H 1/58* (2006.01)
*H01R 4/2487* (2018.01)

(52) U.S. Cl.
CPC ........ *H01H 1/5833* (2013.01); *H01H 1/5855* (2013.01); *H01R 4/2487* (2013.01)

(58) Field of Classification Search
CPC .. H01H 1/5833; H01H 1/5855; H01R 4/2487; H01R 4/66
See application file for complete search history.

(56) References Cited

U.S. PATENT DOCUMENTS 3,585,571 A 6/1971 Davis et al.
3,639,839 A 2/1972 Fukata
3,639,869 A 2/1972 Pedersen
8,369,679 B2 2/2013 Wakileh et al.
9,728,354 B2 8/2017 Skolozdra et al.
11,101,578 B2 8/2021 Kwok
11,165,173 B2 11/2021 Moore
11,199,645 B2 12/2021 Harnden
2021/0132248 A1* 5/2021 Harnden ................ G01V 3/081
2022/0102877 A1 3/2022 Skolozdra et al.

FOREIGN PATENT DOCUMENTS

CN 211502346 U 9/2020

* cited by examiner

*Primary Examiner* — Mohamad A Musleh
(74) *Attorney, Agent, or Firm* — Westman, Champlin & Koehler, P.A.

(57) ABSTRACT

An access point for sending signals along a plurality of tracer wires includes a base and a cover attached to the base. The access point includes a plurality of terminals wherein each of the plurality of terminals include a bore for receiving one of the plurality of tracer wires within a cavity of the base and conductively connect to each of the plurality of tracer wires to each of the terminals. A switching mechanism is slidably positioned between the base and the cover wherein the switching mechanism includes a ground terminal configured to conductively connect to a ground wire. The switching mechanism is configured to slide between a first position where conductive contact is made between the switching mechanism and each of the plurality of terminals and a second, ground open position.

20 Claims, 5 Drawing Sheets

MULTI-TERMINAL TRACER WIRE ACCESS POINT

BACKGROUND

The present disclosure relates to a multi-terminal tracer wire access point that includes a switching mechanism that is movable between an open, ungrounded or ground open position and a closed, grounded or ground closed position for each tracer wire connected to one of the terminals. More particularly, the present disclosure relates to a multi-terminal tracer wire access point that includes a conductive switching mechanism that simultaneously moves relative to each tracer wire terminal between an open, ungrounded or ground open position and a closed, grounded or ground closed position.

Some utility supply lines are constructed of plastic piping or conduit and are buried underground. As the utility lines are non-conductive, conductive tracer wire is buried along with them. A signal is sent along the tracer wire that can be detected by a locator above ground. As the locator moves, it receives a signal along the tracer wire and the location of utility lines can be determined along its length.

In order for the signal to be sent along the tracer wire, the tracer wire must be properly grounded at one tracer wire end or at other strategic points along the utility lines. Grounding of the tracer wire is generally done with a metal grounding rod electrically coupled to a ground wire. The tracer wire and ground wire are terminated and connected to switches at access points.

Typical tracer wire switches require special tools, such as an insulation stripper, to expose the bare metal tracer wire prior to connecting the wire to a terminal. The stripping of the insulation and the connecting of the wire to the terminal can be time consuming and difficult. Additionally, the connection between the tracer wire and the terminal can be exposed, which can allow unauthorized people to tamper with the tracer wire connection at the access point.

There is a need for an access point that does not require special tools to electrically connect a tracer wire to a terminal, or requires insulation to be stripped from the conductor, and that prevents tampering with the connection between the terminal(s) and the tracer wire(s).

SUMMARY

An aspect of the present disclosure relates to an access point for sending signals along a plurality of tracer wires. The access point includes a base with an upper wall having a plurality of spaced apart receptacles and a first slot. A side wall extends from the upper wall, wherein the side wall includes an opening. A cover is attached to the base wherein the cover and the base define a cavity there-between. The cover includes a second slot substantially aligned with the first slot when the cover is attached to the base. A plurality of terminals are positioned within the plurality of receptacles, wherein each of the plurality of terminals include a bore located below the upper wall, wherein the bore is configured to accept one of a plurality of tracer wires. Each of the plurality of terminals is configured to conductively connect with one of the plurality of tracer wires. A switching mechanism is slidably positioned within the cavity, wherein the switching mechanism includes a ground terminal configured to conductively connect to a ground wire. The switching mechanism is configured to be slid within the slots between a first, grounded or ground closed position where conductive contact is made between the switching mechanism and each of the plurality of terminals and a second, ungrounded or ground open position wherein the switching mechanism is detached from the plurality of terminals. The opening in the sidewall is configured to allow the plurality of tracer wires and the ground wire to pass through to the plurality of terminals such that when the access point is mounted to a surface, the connection between the plurality of tracer wires and the plurality the terminals and the ground wire and the ground terminal are substantially inaccessible.

Another aspect of the present disclosure relates to an access point for sending signals along a plurality of tracer wires. The access point includes a base with an upper wall having a plurality of spaced apart receptacles and a first slot. A side wall extends from the upper wall. A cover attaches to the base wherein the cover and the base define a cavity therebetween, wherein the cover includes a second slot substantially aligned with the first slot when the cover is attached to the base. A plurality of terminals are positioned within the plurality of receptacles, wherein each of the plurality of terminals include a bore located below the upper wall, wherein the bore is configured to accept one of a plurality of tracer wires. Each of the plurality of terminals includes a conducting mechanism configured to engage the tracer wire in the bore and conductively contact the tracer wire by piercing an insulating jacket. The access point includes a switching mechanism slidably positioned within the cavity, wherein the switching mechanism includes a ground terminal configured to conductively connect to a ground wire. The switching mechanism is configured to be slid within the slots between a first, grounded or ground closed position where conductive contact is made between the switching mechanism and each of the plurality of terminals and a second, ungrounded or ground open position wherein the switching mechanism is detached from the plurality of terminals.

Another aspect of the present disclosure relates to an access point for sending signals along a plurality of tracer wires. The access point includes a base with an upper wall having a plurality of spaced apart receptacles and a first slot. A side wall extends from the upper wall, wherein the side wall includes an opening. A cover is attached to the base wherein the cover and the base define a cavity there-between. The cover includes a second slot substantially aligned with the first slot when the cover is attached to the base. A plurality of terminals are positioned within the plurality of receptacles, wherein each of the plurality of terminals include a bore located below the upper wall, wherein the bore is configured to accept one of a plurality of tracer wires. Each of the plurality of terminals includes a conducting mechanism configured to engage the tracer wire in the bore and conductively contact the tracer wire by piercing an insulating jacket. A switching mechanism is slidably positioned within the cavity, wherein the switching mechanism includes a ground terminal configured to conductively connect to a ground wire. The switching mechanism is configured to be slid within the slots between a first, grounded or ground closed position where conductive contact is made between the switching mechanism and each of the plurality of terminals and a second, unground or ground open position wherein the switching mechanism is detached from the plurality of terminals. The opening in the sidewall is configured to allow the plurality of tracer wires and the ground wire to pass through to the plurality of terminals such that when the access point is mounted to a surface, the connection between the plurality of tracer wires and the plurality the terminals and the ground wire and the ground terminal are substantially inaccessible.

DETAILED DESCRIPTION

The present disclosure relates to a multi-terminal tracer wire access point that is used to provide above-ground access a plurality of separate, underground tracer wires. The above-ground access point conveniently allows an operator to connect the tracer wires to ground or to unground the plurality of tracer wires at selected locations along the utility supply line and to send a signal along each tracer wire. The multi-terminal tracer wire access point lessens the number of access points that are required and allows each of the plurality of tracer wires to be connected to ground from a single location, which allows a separate signal to be sent along each tracer wire from a respective terminal. The signal emits an electric field that can be sensed by an above-ground receiver, which locates an underground utility supply line that is buried with the tracer wire.

The presently disclosed multi-terminal tracer wire access point is configured to connect each tracer wire to a respective terminal with a conductive, insulation jacket piercing connecting member that electrically connects the insulated metal wire to the terminal by piercing the insulation jacket. As such, the access point of the present disclosure does not require special tools to connect the tracer wires to the terminals, such as a wire stripper, which saves on time during installation and/or maintenance.

The presently disclosed multi-terminal trace wire access point is also configured to locate the connection of the tracer wires to respective terminals in a restricted area when the access point is mounted to a surface. The restricted location of the connections aids in making the connection between the respective tracer wires and terminals substantially tamper proof when the access point is mounted to the surface.

Figure 1:
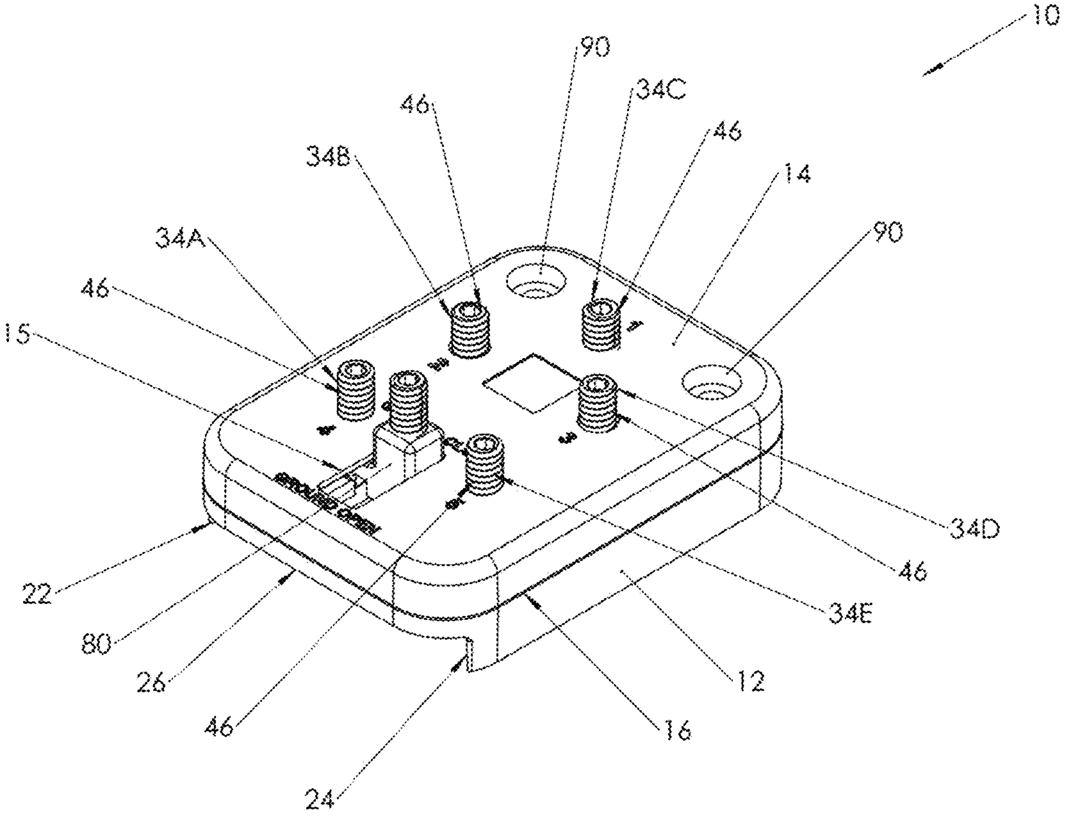
FIG. 1 is an isometric view of a multi-terminal access point.
Figure 2:
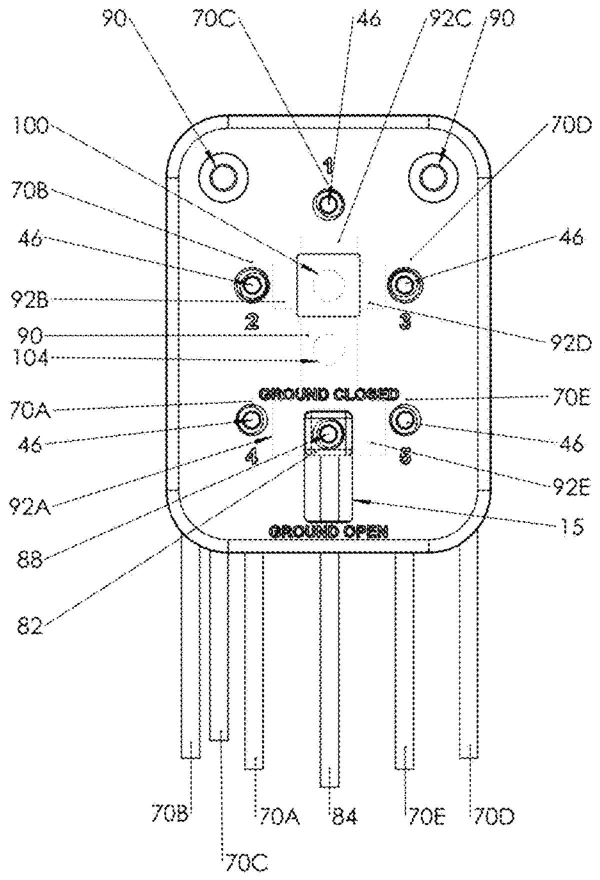
FIG. 2 is a front view of the multi-terminal access point with a switching mechanism in a first, grounded or ground closed position.
Figure 3:
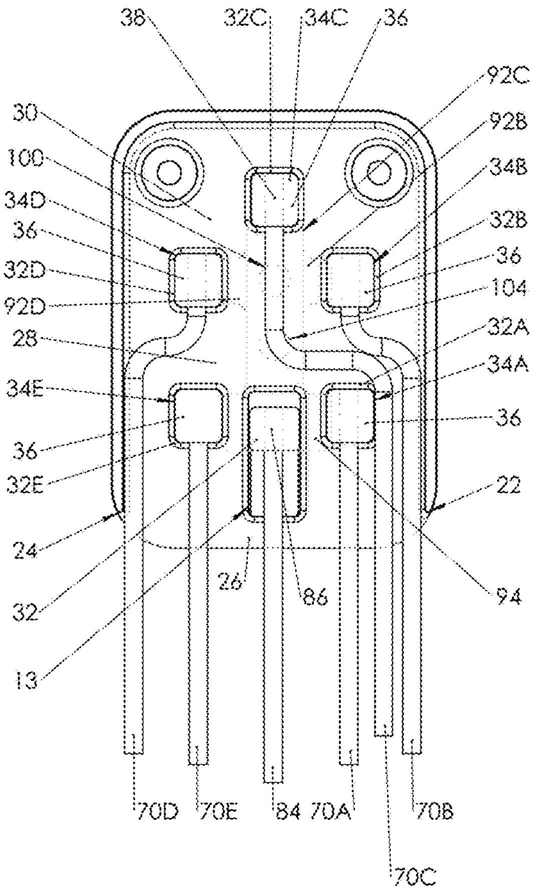
FIG. 3 is a back view of the multi-terminal access point with the switching mechanism in a first, grounded or ground closed position.
Figure 4:
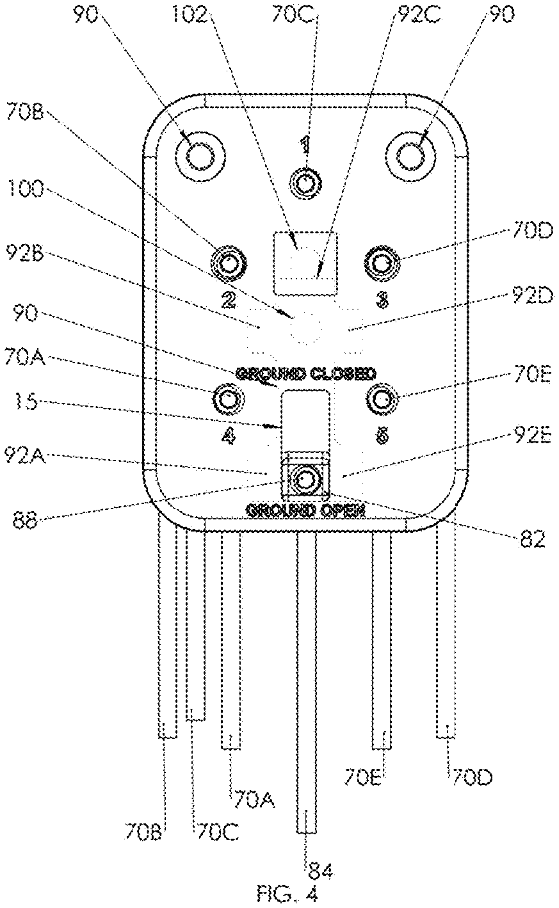
FIG. 4 is a front view of the multi-terminal access point with the switching mechanism in a second, ungrounded or ground open position.
Figure 5:
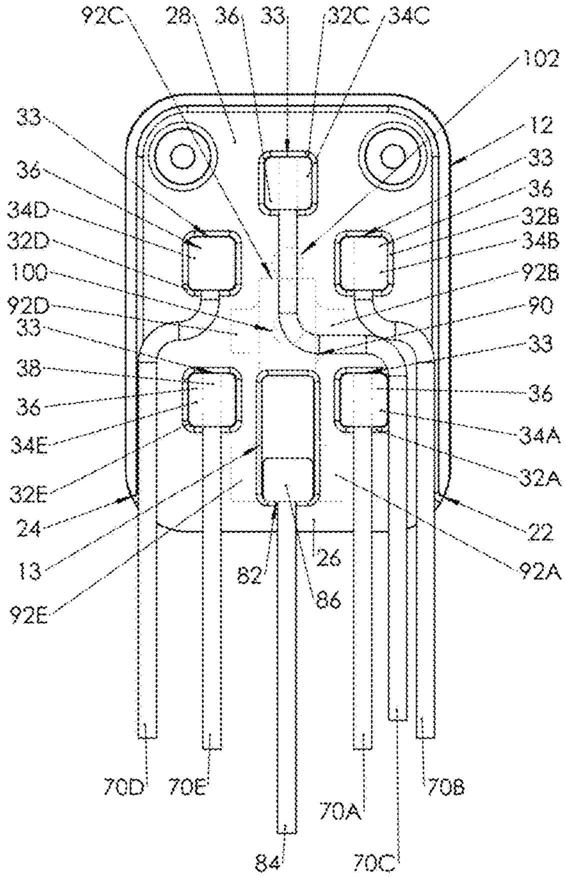
FIG. 5 is a back view of the multi-terminal access point with the switching mechanism in the second, ungrounded or ground open position.

Referring to FIG. 1, a multi-terminal access point is illustrated at 10. The access point 10 includes base 12 that retains a plurality of terminals that accept tracer wires and a cover 14 that attaches proximate an upper surface 16 of the base 12. The attached base 12 and cover 14 form a cavity into which a switching mechanism 80 is positioned and slidably retained such that the switching mechanism 80 is moveable from a first, grounded or ground closed position as illustrated in FIGS. 1-3 and a second, ungrounded or ground open position as illustrated in FIGS. 4 and 5.

Referring to FIGS. 1-5, the base 12 includes a side wall 15 that extends from the upper edge 16 about the perimeter of a top wall 30. The side wall 15 terminates at spaced apart ends 22 and 24 that define an opening 26 to an interior space 28 that provides access to wire receptacles in the plurality of terminals.

The top wall 30 that includes a plurality of receptacles 32A-E that house a plurality of terminals 34A-E. The terminals 34A-E are similarly constructed and therefore the structure of one receptacle will be described in detail.

Each of the terminals 34A-E include a bottom portion 36 that extends through an opening 33 in the receptacle 32A-E and into the interior space 28, wherein the bottom portion 36 includes a bore 38 that is sized to accept one of the tracer wires 70A-E. Each of the tracer wires 70A-E is positioned through the opening 26 and into the interior space 28 such that ends of the tracer wires 50A-E can be positioned into each of the bores 38 in the plurality of terminals 34A-E.

Figure 6:
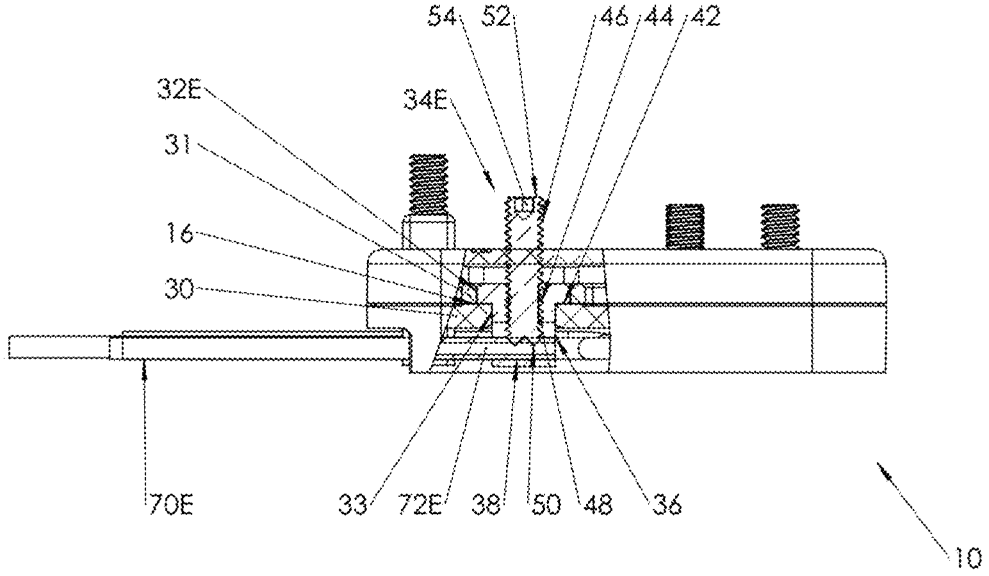
FIG. 6 is a sectional view of a terminal engaging the insulated tracer wire.

Referring to FIG. 6, a cross-sectional view of the terminal 34E is illustrated with the tracer wire 70E within the bore 38 in the bottom portion 36. The terminal 34 includes an upper portion 40 that includes a shoulder 42 that abuts the upper surface 16 of the top wall 30 such that the terminal 34E is retained within the receptacle 32E. The receptacle 32E includes an upwardly extending lip 31 that engages an outer edge 44 of the upper portion 40 such that the terminal 34E is non-rotatably retained within the receptacle 32E.

The terminal 34E include a threaded bore 44 that extends from an upper edge 41 of the upper portion 40 where the threaded bore 44 intersects with the bore 38. A threaded set screw 46 threadably engages the treaded bore 44. The threaded set screw 46 includes a bottom end 48 with a substantially circular cutting edge 50. A top end 52 of the set screw 46 includes a receptacle 54 for a standard screwdriver. The screwdriver is rotated to move the bottom end 48 into the bore 38 such that the substantially circular cutting edge 50 pierces an insulating jacket 72E encasing the tracer wire 70E such that a conductive connection is made between the threaded set screw 46 and the tracer wire 70E.

The use of the set screw 46 with the substantially circular cutting edge 50 allows the tracer wires 70A-E to be connected to the terminals 34A-E with a common tool without the need to strip the insulating jacket from end of the tracer wires 70A-E. Only using common tools allows for a faster and more efficient connection of the tracer wires 70A-E to the access point 10.

While a standard screwdriver is disclosed as the tool used to conductively connect the tracer wire 70E to the set screw 46, other receptacles on the top end 52 of the set screw 46 and other common tools could also be utilized, such as, but not limited to a torxs wrench, a hex key wrench and a Phillips screw driver.

Referring back to FIGS. 1-5, the switching mechanism 80 includes a similarly formed terminal 82 that accepts a ground wire 84. The ground wire 84 is positioned within a bore 86 and a conductive connection is made between the ground wire and the switching mechanism 80 with a threaded set screw 88 with a substantially circular cutting edge piercing the insulating jacket and conductively connecting to the ground wire 84.

With the tracer wires 70A-70E conductively connected to the terminals 34A-34E and the ground wire 84 conductively connected to the switching mechanism 80, the access point

10 is secured to a surface using through bores 90 within the base 12 and cover 14. The through bores 90 are configured to accept fastening members including, but no limited to screws, bolts that engage nuts or a thread bore, nails and the like. With the access point 10 secured to the surface, the connection between the tracer wires 70A-E and the terminals 34A-E and the connection between the switching mechanism 80 and the ground wire 84 are not readily accessible without detaching the access point 10 from the surface. Making the connections between the wires and the terminals and switching mechanism relatively inaccessible aids in preventing unwanted manipulation of the connections.

With the access point 10 attached to a surface, the switching mechanism 80 can be manipulated between the first, grounded or ground closed position as illustrated in FIGS. 1-3 and the second, ungrounded or ground open position as illustrated in FIGS. 4-5. The switching mechanism 80 is slidable with a slot 15 in the cover 14 and a slot 13 in the base 12 between the first and second positions.

The switching mechanism 80 includes a central portion 90 that includes the terminal 82 that is conductive connected to the ground wire 84. Connecting tabs 92A-E extend from the central portion 90 where the connecting tabs 92A-E have a thickness that is less than the thickness of the central portion.

To position the switching mechanism 80 into the first, grounded or ground closed position, the switch mechanism 80 is slid within the slots 15 and 13 with manual force until the terminal 82 contacts an upper surface of the slot 15, as illustrated in FIGS. 1-3. As the switching mechanism 80 in the first, grounded or ground closed position, the connecting tabs 92A-E slide over the terminals 34A-E in a space below the cover 14 and make conductive contact to ground the tracer wires 70A-E. The connecting tabs 92A-E are sized to contact the terminals 34A-E without engaging the threaded set screws 46.

The central portion 90 includes a recessed magnet 100 that engages a first, upper magnet 102 within the base when the switching mechanism 80 is in the first position. The engagement of the recessed magnet 100 with the first, upper magnet 102 retains the switching mechanism 80 in the first position.

Referring to FIGS. 4-5, the switching mechanism 80 is moved to the second, ungrounded or ground open position with manual force by overcoming the magnetic attraction between the recessed magnet 100 and the first, upper magnet 102. The switching mechanism 80 is slid within the slots 13 and 15 until the terminal 82 contacts a lower surface of the slot 15 such that the connecting tabs 92A-E slide to a disconnected position relative to the terminals 34A-E. When the switching mechanism 80 is moved to the second, ungrounded position where the recessed magnet 100 is magnetically coupled to a second, lower magnet 104 within the base 12.

The magnetic attraction between the recessed magnet 100 and the first, upper magnet 102 provides a first positive stop that retains the switching mechanism 80 in the first, grounded or ground closed position that prevents the switching mechanism 80 from slipping into the second, ungrounded or ground closed position. Similarly, the magnetic attraction between the recessed magnet 100 and the second, lower magnet 104 provides a second positive stop that retains the switching mechanism 80 in the second, ungrounded or ground open position. While magnetic positive stops are disclosed other positive stops are within the scope of the present disclosure including, but not limited to, cooperating protuberances and grooves, spring loaded balls engaging recesses and frictional engagements.

As disclosed and illustrated in FIGS. 1-5, the access point 10 is configured to provide access to five tracer wires 70A-E. However, the present disclosure is not limited to five tracer wires. Rather, the access point can be utilized with any number of tracer wires that is desired.

Figure 7:
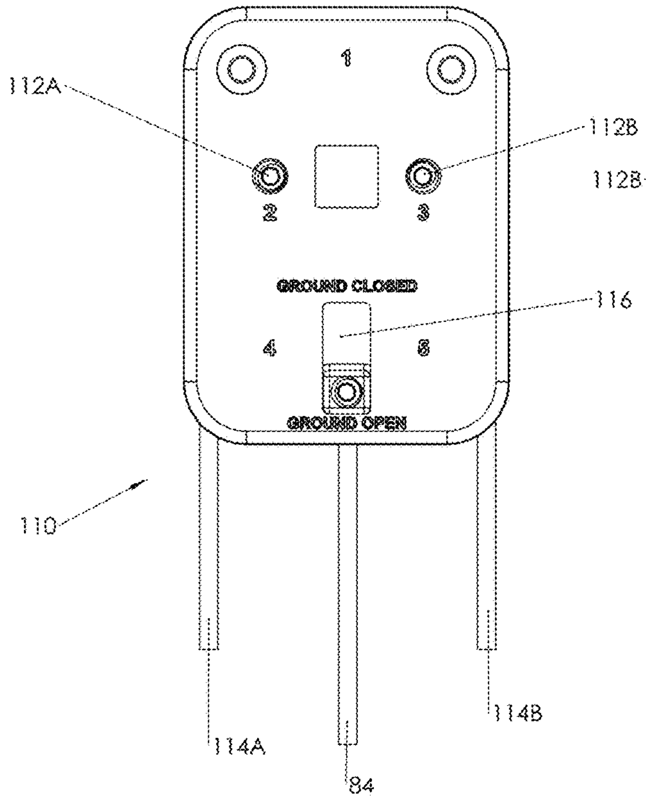
FIG. 7 is a front view of a two-terminal access point with the switching mechanism in a second, ungrounded or ground open position.
Figure 8:
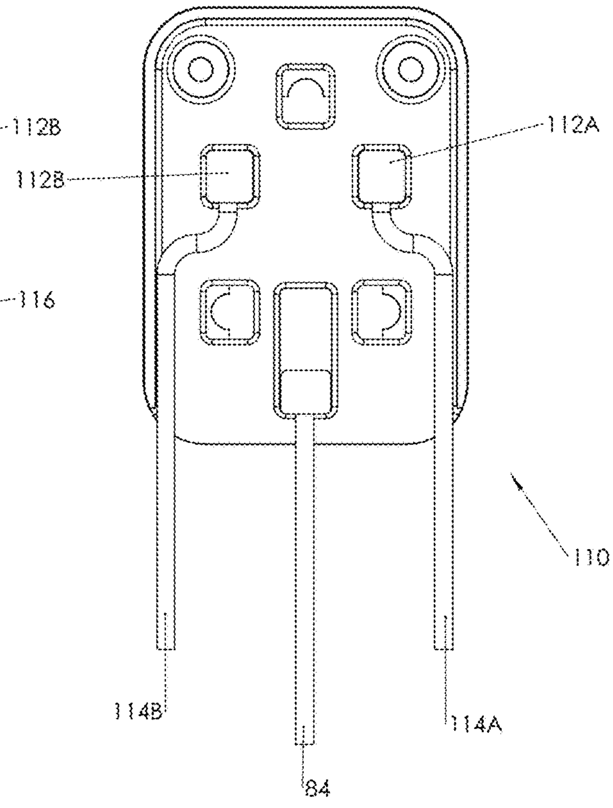
FIG. 8 is a back view of the two-terminal access point with the switching mechanism in the second, ungrounded or ground open position.

Referring to FIGS. 7 and 8, and by way of non-limiting example, an access point 110 is illustrated that includes two terminals 112A and 112B that accept tracer wires 114A and 114B. The switching mechanism 116 is similarly configured as the switching mechanism 80 and functions similar to that of the switching mechanism 80 as described above between the first, grounded or ground closed position and the open, ungrounded or ground open position.

As the utility supply lines are installed along with the tracer wire underground, two or more access points are strategically located along the length of the tracer wire, based upon length and/or configuration of the utility supply lines. Each of the access points is connected to the plurality of tracer wires and to ground, as disclosed above. To send a signal along one of the tracer wires, one of the switching mechanisms 80, 116 in one of the access points 10, 110 at a starting point is positioned into the second ungrounded or ground open position while the switching mechanism 80, 116 of another access point 10, 110 at an end point is positioned into the first, grounded or ground closed position. A signal wire of a signal generator is be attached to one of the set screws 46 extending from the cover 14 and a ground wire of the signal generator is attached to the ground set screw 88 extending from the cover 14. A locating signal is the sent from the start point to the end point between the two access points 10, 110 along one of the tracer wires 70A-E, where the signal can be received above ground with a locator. The signal generator can be attached to each of the set screws 46 in series from the starting point to one or more end points which can increase the efficiency of the person locating the utility lines. Once the desired tracer wires 70A-E are located above ground, the signal wire and the ground wire of the signal generator are disconnected from the set screw 46 and the ground set screw 88, and the switching mechanism 80, 116 of the access point 10, 110 at the start point is moved to the first, grounded or ground closed position, such that the tracer wires 70A-E are grounded between the starting point and the end point.

The access points 10, 110 can be provided in various colors, such that the access points 10, 110 are color-coded to meet American Public Works Association (APWA) standards to provide instant identification of the traced utility. For example, the lid can be provided in the appropriate color red to identify electric utilities, yellow for gas, orange for communication, blue for potable water, green for sewer and purple for reclaimed water.

Although the present disclosure has been described with reference to preferred embodiments, workers skilled in the art will recognize that changes may be made in form and detail without departing from the spirit and scope of the disclosure.

The invention claimed is:

1. An access point for sending signals along a plurality of tracer wires, the access point comprising:

a base comprising:

an upper wall having a plurality of spaced apart receptacles and a first slot; and a side wall extending from the upper wall, wherein the side wall includes an opening;

a cover attached to the base wherein the cover and the base define a cavity therebetween, wherein the cover includes a second slot substantially aligned with the first slot when the cover is attached to the base;

a plurality of terminals positioned within the plurality of receptacles, wherein each of the plurality of terminals include a bore located below the upper wall, wherein the bore is configured to accept one of a plurality of tracer wires and wherein each of the plurality of terminals is configured to conductively connect to each of the plurality of tracer wires; and a switching mechanism slidably positioned within the cavity, wherein the switching mechanism includes a ground terminal configured to conductively connect to a ground wire, the switching mechanism configured to be slid with the first and second slots between a first, grounded or ground closed position where conductive contact is made between the switching mechanism and each of the plurality of terminals and a second, ungrounded or ground open position wherein the switching mechanism is detached from the plurality of terminals;

wherein the opening is configured to allow the plurality of tracer wires and the ground wire to pass through to the plurality of terminals such that when the access point is mounted to a surface, the connection between the plurality of tracer wires and the plurality the terminals and the ground wire and the ground terminal are substantially inaccessible.

2. The access point of claim 1, wherein each of the plurality of terminals further comprises:

a threaded bore intersecting the bore configured to accept one of the tracer wires wherein the threaded bore is accessible through the cover; and a threaded set screw having a cutting edge on a distal end, wherein the threaded set screw is configured to engage and pierce an insulating jacket on the tracer wire to make conductive contact with the tracer wire, wherein a proximal end of the threaded set screw extends beyond the cover and provides a conductive access point to send a signal down the tracer wire.

3. The access point of claim 2, wherein the proximal end of the threaded set screw includes a receptacle configured to accept a tool to rotate the threaded set screw, wherein the conductive contact between the threaded set screw and the tracer wire is configured to be made without having to strip the insulating jacket for an end of the tracer wire.

4. The access point of claim 1, wherein the switching mechanism of a unitary construction of a conductive metal.

5. The access point of claim 1, wherein the switching mechanism further comprises:

a central portion; and a plurality of spaced apart connecting tabs extending from the central portion, wherein when the switching mechanism is moved to the first, grounded or ground closed position, each of the plurality of connecting tabs is conductively connected to each of the plurality of terminals and wherein when the switching mechanism is moved to the second, ungrounded or ground open position each of the plurality of connecting tabs is conductively disconnected from each of the plurality of terminals.

6. The access point of claim 1, and further comprising:

a first positive stop configured to retain the switching mechanism in the first, grounded or ground closed position; and a second positive stop configured to retain the switching mechanism in the second, ungrounded or ground open position.

7. The access point of claim 6, wherein the first positive stop comprises:

a magnet within the switching mechanism; and a first magnet within the base, wherein a magnetic attraction between the magnet and the first magnet retains the switching mechanism in the first, grounded or ground closed position.

8. The access point of claim 6, wherein the second positive stop comprises a magnet within the switching mechanism; and a second magnet within the base, wherein a magnetic attraction between the magnet and the second magnet retains the switching mechanism in the second, ungrounded or ground open position.

9. An access point for sending signals along a plurality tracer wires, the access point comprising:

a base comprising:

an upper wall having a plurality of spaced apart receptacles and a first slot; and a side wall extending from the upper wall;

a cover attached to the base wherein the cover and the base define a cavity therebetween, wherein the cover includes a second slot substantially aligned with the first slot when the cover is attached to the base;

a plurality of terminals positioned within the plurality of receptacles, wherein each of the plurality of terminals include a bore located below the upper wall, wherein the bore is configured to accept one of a plurality of tracer wires and wherein each of the plurality of terminals includes a conducting mechanism configured to engage the tracer wire in the bore and conductively contact the tracer wire by piercing an insulating jacket; and a switching mechanism slidably positioned within the cavity, wherein the switching mechanism includes a ground terminal configured to conductively connect to a ground wire, the switching mechanism configured to be slid with the first and second slots between a first, grounded or ground closed position where conductive contact is made between the switching mechanism and each of the plurality of terminals and a second, ungrounded or ground open position wherein the switching mechanism is detached from the plurality of terminals.

10. The access point of claim 9, wherein the conducting mechanism of each of the plurality of terminals further comprises:

a threaded bore intersecting the bore configured to accept one of the tracer wires wherein the threaded bore is accessible through the cover; and a threaded set screw having a cutting edge on a distal end, wherein the threaded set screw is configured to engage and pierce an insulating jacket on the tracer wire to make conductive contact with the tracer wire, wherein a proximal end of the threaded set screw extends beyond the cover provides a conductive access point to send a signal down the tracer wire.

11. The access point of claim 10, wherein the proximal end of the threaded set screw includes a receptacle configured to accept a tool to rotate the threaded set screw, wherein the conductive contact between the threaded set screw and the tracer wire is configured to be made without having to strip the insulating jacket for an end of the tracer wire.

12. The access point of claim 9, wherein the switching mechanism of a unitary construction of a conductive metal.

13. The access point of claim 9, wherein the switching mechanism further comprises:

a central portion; and a plurality of spaced apart connecting tabs extending from the central portion, wherein when the switching mechanism is moved to the first, grounded or ground closed position, each of the plurality of connecting tabs is conductively connected to each of the plurality of terminals and wherein when the switching mechanism is moved to the second, ungrounded or ground open position each of the plurality of connecting tabs is conductively disconnected from each of the plurality of terminals.

14. The access point of claim 9, and further comprising:

a first positive stop configured to retain the switching mechanism in the first, grounded or ground closed position; and a second positive stop configured to retain the switching mechanism in the second, ungrounded or ground open position.

15. The access point of claim 14, wherein the first positive stop comprises:

a magnet within the switching mechanism; and a first magnet within the base, wherein a magnetic attraction between the magnet and the first magnet retains the switching mechanism in the first, grounded or ground closed position.

16. The access point of claim 14, wherein the second positive stop comprises a magnet within the switching mechanism; and a second magnet within the base, wherein a magnetic attraction between the magnet and the second magnet retains the switching mechanism in the second, ungrounded or ground open position.

17. The access point of claim 9, wherein the sidewall of the base includes spaced apart ends defining an opening configured to allow the plurality of tracer wires and the ground wire to pass through to the plurality of terminals such that when the access point is mounted to a surface, the connection between the plurality of tracer wires and the plurality the terminals and the ground wire and the ground terminal are substantially inaccessible.

18. An access point for sending signals along a plurality tracer wires, the access point comprising:

a base comprising:

an upper wall having a plurality of spaced apart receptacles and a first slot; and a side wall extending from the upper wall, wherein the side wall includes an opening;

a cover attached to the base wherein the cover and the base define a cavity therebetween, wherein the cover includes a second slot substantially aligned with the first slot when the cover is attached to the base;

a plurality of terminals positioned within the plurality of receptacles, wherein each of the plurality of terminals include a bore located below the upper wall, wherein the bore is configured to accept one of a plurality of tracer wires and wherein each of the plurality of terminals includes a conducting mechanism configured to engage the tracer wire in the bore and conductively contact the tracer wire by piercing an insulating jacket; and a switching mechanism slidably positioned within the cavity, wherein the switching mechanism includes a ground terminal configured to conductively connect to a ground wire, the switching mechanism configured to be slid within the first and second slots between a first, grounded or ground closed position where conductive contact is made between the switching mechanism and each of the plurality of terminals and a second, ungrounded or ground open position wherein the switching mechanism is detached from the plurality of terminals;

wherein the opening is configured to allow the plurality of tracer wires and the ground wire to pass through to the plurality of terminals such that when the access point is mounted to a surface, the connection between the plurality of tracer wires and the plurality the terminals and the ground wire and the ground terminal are substantially inaccessible.

19. The access point of claim 18, wherein the conducting mechanism of each of the plurality of terminals further comprises:

a threaded bore intersecting the bore configured to accept one of the tracer wires wherein the threaded bore is accessible through the cover; and a threaded set screw having a cutting edge on a distal end, wherein the threaded set screw is configured to engage and pierce an insulating jacket on the tracer wire to make conductive contact with the tracer wire, wherein a proximal end of the threaded set screw extends beyond the cover provides a conductive access point to send a signal down the tracer wire.

20. The access point of claim 18, wherein the proximal end of the threaded set screw includes a receptacle configured to accept a tool to rotate the threaded set screw, wherein the conductive contact between the threaded set screw and the tracer wire is configured to be made without having to strip the insulating jacket for an end of the tracer wire.

* * * * *